United States Patent
Oberschmid et al.

[11] Patent Number: 6,074,088
[45] Date of Patent: Jun. 13, 2000

[54] METHOD AND DEVICE FOR MEASURING A TEMPERATURE OF A ROTATING SUPPORT

[75] Inventors: Reimund Oberschmid, Sinzing; Konrad Sporrer, Regensburg, both of Germany

[73] Assignee: Siemens Aktiemgesellschaft, Munich, Germany

[21] Appl. No.: 09/010,921

[22] Filed: Jan. 22, 1998

[30] Foreign Application Priority Data

Jan. 22, 1997 [DE] Germany ............... 197 02 140

[51] Int. Cl.[7] ................................................. G01K 1/08
[52] U.S. Cl. ................. 374/153; 374/131; 374/117
[58] Field of Search ................. 374/153, 117, 374/131

[56] References Cited

U.S. PATENT DOCUMENTS

| | | | |
|---|---|---|---|
| 3,609,728 | 9/1971 | Quinn et al. | 374/183 |
| 3,738,175 | 6/1973 | Linsig | 310/66 |
| 3,792,342 | 2/1974 | Ogawa et al. | 374/153 |
| 3,890,841 | 6/1975 | Brixy | 374/175 |
| 3,891,861 | 6/1975 | Weber et al. | 307/117 |
| 3,961,946 | 6/1976 | Makino et al. | 148/300 |
| 4,197,742 | 4/1980 | Freiberg et al. | 374/154 |
| 4,297,851 | 11/1981 | Paddock et al. | 374/182 |
| 4,438,598 | 3/1984 | Wohlmuth | 374/131 |
| 4,518,962 | 5/1985 | Imose et al. | 361/796 |
| 4,588,954 | 5/1986 | Seymour | 374/144 |
| 5,527,110 | 6/1996 | Abraham et al. | 374/141 |
| 5,893,643 | 4/1999 | Kumar et al. | 374/131 |

FOREIGN PATENT DOCUMENTS

| | | |
|---|---|---|
| 0011862A1 | 6/1980 | European Pat. Off. . |
| 2341354 | 2/1975 | Germany . |
| 3205460A1 | 2/1983 | Germany . |
| 1359574 | 7/1974 | United Kingdom . |

*Primary Examiner*—Edward H. Tso
*Assistant Examiner*—Pia Tibbits
*Attorney, Agent, or Firm*—Herbert L. Lerner; Laurence A. Greenberg; Werner H. Stemer

[57] ABSTRACT

The temperature of a support which rotates with a predetermined angular velocity about a rotational axis is measured. One of more temperature sensors are thermally coupled and rotate with the support. A measurement configuration with an electronic evaluation circuit is assigned to the temperature sensor. The temperature sensor has a ferromagnetic or paramagnetic material, the magnetic susceptibility of which depends on the temperature according to the Curie law or the Curie-Weiss law. The measurement configuration has a magnetizing device assigned to the temperature sensor and a detector device which is fixed relative to the rotating support. The detector device delivers a measurement signal proportional to the temperature of the support when the temperature sensor passes by the detector device.

27 Claims, 3 Drawing Sheets

METHOD AND DEVICE FOR MEASURING A TEMPERATURE OF A ROTATING SUPPORT

BACKGROUND OF THE INVENTION

Field of the Invention

The invention pertains to a device and a method for measuring a temperature of a support rotating with predetermined angular velocity about a rotational axis. At least one temperature sensor is thermally coupled to the support, and a measurement configuration which is assigned to the at least one temperature sensor may be coupled with an electronic evaluation circuit.

In the epitaxial coating of semiconductor wafers, control of the epitaxial growth process requires precise regulation, or at least knowledge, of the temperature of the support plate on which the semiconductor wafer is placed. The temperature of the rotating epitaxy wafer support plate is conventionally measured with pyrometric measuring methods. These processes, however, often lead to false measurement results because of the variable color coefficient of the surface of the support or of the epitaxially applied layers. Since the temperature of the epitaxy wafer has an important effect on the growth process of this wafer, and the wafer temperature is coupled with the temperature of the support plate substantially via the gas used in the epitaxy method and results merely to a lesser extent from the exchange of radiation energy, the actual temperature of the support plate can be recorded only indirectly when pyrometric measurements are used. More accurate measurement results are given by direct thermometric methods, in which a temperature-dependent resistor (for example a 1 kΩ platinum wire resistor) is imbedded in the support plate, with its connections routed via a ceramically insulated wire to a slip ring on the rotational shaft. However, because of the comparatively high temperatures to be measured, difficulties arise with a measurement configuration of this type when trying to achieve a permanently reliable electric contact. A further secondary condition which generally applies in systems of this type is that no materials which, at the high usual operating temperatures of generally more than 500° C. release even a small amount of gases, should be introduced into the reactor space along with the means for measuring the temperature of the wafer support plate. This means that the gas pressure of the measuring means that are used must be extremely low even at high temperatures.

SUMMARY OF THE INVENTION

It is accordingly an object of the invention to provide a device and a method for measuring a temperature of a rotating support in a semiconductor coating process, which overcomes the above-mentioned disadvantages of the heretofore-known devices and methods of this general type and which permit sufficiently accurate measurement of the actual temperature of the support plate with the simplest of designs and which make it possible to easily retrofit already existing systems.

With the foregoing and other objects in view there is provided, in accordance with the invention, a device for measuring a temperature of a support rotating with predetermined angular velocity about an axis of rotation, comprising:

at least one temperature sensor thermally coupled to and rotating with a rotating support, the at least one temperature sensor being formed of a material selected from the group consisting of ferro-magnetic, paramagnetic, and ferroelectric materials and having a temperature-dependent magnetic or electric susceptibility;

a measurement configuration assigned to the at least one sensor, the measurement configuration including a polarizing device for polarizing the at least one temperature sensor, and a stationary detector device disposed such that the at least one sensor passes by the detector device upon a rotation of the rotating support and the detector device outputs a measurement signal corresponding to a temperature of the support.

There is also provided, in accordance with the invention, a method for measuring a temperature of a support rotating with predetermined angular velocity about an axis of rotation, which comprises:

providing a temperature sensor thermally coupled to a rotating support, the temperature sensor having a material selected from a group of materials consisting of ferromagnetic, paramagnetic, and ferroelectric materials, and having a temperature-dependent susceptibility according to the Curie law and Curie-Weiss law;

providing a measurement configuration with a magnetizing device and a detector device which is fixed relative to the rotating support; and detecting a measurement signal with the measurement configuration when the temperature sensor passes by the detector device as the support rotates together with the temperature sensor.

The objects of the invention are thus satisfied in that the at least one temperature sensor comprises a ferromagnetic or paramagnetic and/or ferroelectric material whose magnetic or electric susceptibility depends on the temperature according to Curie law or the Curie-Weiss law. The measurement configuration has a polarizing device assigned to the at least one temperature sensor, and a detector device which is fixed relative to the rotating support. The detector delivers a measurement signal corresponding to the temperature of the support when the at least one temperature sensor passes.

A fundamental concept of the invention, for the purpose of the contactless measurement of the temperature of a rotating support, is the magnetic (or ferroelectric) temperature sensor made of a material which, in the technologically relevant temperature range of the support, exhibits a change in polarization with temperature. The temperature sensor is in this case connected in thermally conductive contact with the support, or is incorporated in it, or is formed by the support itself or a part thereof. When the temperature sensor, made of magnetizable or electrifiable material, passes the measurement configuration, the magnetic (or electric) polarization changes according to the polarizability of the temperature sensor, and a brief alternating voltage pulse is produced which, in phase relation to the angular velocity of the support for constant rotation and exact axial journaling of the support, gives a useful signal whose amplitude is sensitively and, as a rule, monotonically dependent on the temperature of the temperature sensor and therefore of the support.

The invention provides for the following particular advantages:

Sufficiently accurate and reproducible measurement of the actual support temperature is made possible, but without substantial constructional modifications required of the support. The invention is thus optimally suited to the simple retrofitting of already existing systems.

On account of the contactless measurement principle, slip contacts which are susceptible to interference are superfluous.

The temperature can be measured independently of the layers growing on the support plate.

Ferromagnetic and/or ferroelectric materials are generally crystalline or compactly sintered crystallite mixtures with low vapor pressure, even at high temperatures. Undesired contributions from the temperature sensor due to gases released during the coating process in these systems are therefore substantially avoided.

In accordance with an additional feature of the invention, the polarizing device assigned to the at least one temperature sensor has a permanent magnet or electromagnet that is fixed relative to the rotating support, and the detector device is formed by an inductor, in particular a coil which is electrically coupled to the evaluation circuit. The coil which belongs to the detector device, is disposed substantially in the support plane and is fixed relative to the rotating support, picks up electromagnetic signals appertaining to the temperature sensor which passes it and has been magnetized by the polarizing device. The polarizing device may in this case be formed by an additional coil which is likewise arranged in the support plane and through which a direct or alternating current from a current source flows, or in the form of a fixed permanent magnet in the support plane in the vicinity of the detector device.

In a further preferred embodiment, one option is that both the polarizing device and the detector device are formed by a coil which is electrically coupled to the evaluation circuit and to which a direct or alternating electric current is applied to produce a polarizing field. In this embodiment, the coil which picks up the electromagnetic signal from the temperature sensor is also the coil that excites the magnetic field.

In accordance with an added feature of the invention, two or more temperature sensors are arranged with rotational symmetry on or in the support. For example, the temperature sensors may, in the form of two bolts with a diameter of about 5 mm each and a length of about 10 mm, be positively fitted with exact rotational symmetry into suitable bores at the outer periphery of the support or the rotating plate. The sensors are disposed so as to assure the rotational balancing of the support. For the purpose of allowing easy replacement, the bolts may be provided with a screw thread.

A further option is not to use one ferromagnetic material with a fixed Curie temperature for the temperature sensor, but instead either to distribute at least two different ferro- or paramagnetic materials with rotational symmetry on the perimeter of the support, or for each temperature sensor to consist of a structural unit of a plurality of ferro- or paramagnetic materials with different Curie temperatures, chosen suitably with a view to extending the range of temperature measurement, for example in the form of a plurality of rectangular rods arranged next to one another or in the form of tubes arranged inside one another.

Although, as in prior art coating systems, the support generally consists of a non-magnetic material, for example graphite or molybdenum, a further option according to the invention is that the entire support itself is deliberately made of a suitable ferromagnetic material with suitable temperature dependence of its magnetic susceptibility, and itself acts as the temperature sensor. In this case, magnetic non-uniformities, or magnetic irregularities, for example in the form of grooves machined into the edge or indentations or other discontinuities, are preferably provided in the peripheral region of the magnetic support, in order to produce in the measurement configuration the alternating voltage pulses needed for the temperature measurement. The walls of the coating systems, which enclose the reactor space, should in this case in the vicinity of the temperature sensor consist as far as possible of material with no or only little ferromagnetic action, for example aluminum or austenitic steel (stainless steel), as is generally the case in existing systems.

Suitable materials for the at least one temperature sensor include, in particular, ferromagnetic materials or alloys which generally have, below the Curie temperature $T_c$, an approximately constant high magnetizability $\mu \gg 1$ and a magnetization which decreases above the Curie temperature $T_c$ according to the Curie-Weiss law $\mu=1+C/(T-T_c)$, where C being the Curie constant. Ferromagnetic materials are known to have a Curie point, i.e. temperature, at which, in ferromagnets, spontaneous magnetization vanishes and magnetic order breaks up. At the Curie temperature, a phase transition between the polar and non-polar state takes place. Above the Curie temperature, ferromagnetic materials behave as paramagnetic materials. Paramagnetism generally refers to the phenomenon that, in an external magnetic field H, a material experiences a magnetization M in the direction of this field. For weak fields, the magnetization M is proportional to H: $M=X \cdot H$, the proportionality factor, the susceptibility X, being positive. X and therefore the magnetic permittivity (magnetizability) $\mu=1+X$ generally depends on the temperature T (Curie law).

For a predetermined temperature dependence of the magnetic permittivity or magnetizability, it is particularly suitable to have a ferro- or paramagnetic material with a comparatively small coerce force (soft magnetic material).

A particularly preferred option is therefore that the magnetic material of the at least one temperature sensor comprises iron with a Curie temperature of about 780° Celsius, cobalt with a Curie temperature of about 1130° Celsius, nickel with a Curie temperature of about 375° Celsius, or a nickel alloy, in particular 78 Permalloy with 78.5% nickel and a Curie temperature of about 600° Celsius. For example, for a temperature range to be measured of about 650° Celsius to 750° Celsius, a material having a Curie temperature $T_c$ of just below 650° Celsius is preferred. It is, however, not absolutely necessary for the Curie temperature to lie exactly within the working temperature range of interest. Instead, the Curie temperature of the chosen material for the temperature sensor may, for example, also lie below the temperature range of interest, and for example only be passed through during a heating process. During this process of heating the temperature, there is a further option of indirectly calibrating further temperature sensors which are in thermal contact with the supports to be regulated (for example thermocouples or pyrodetectors in the thermal radiation field of the heater or the support or both), in which case a functional relationship relating to this may be determined either theoretically or practically from tests, and applied.

The following include possible measures for broadening the range of temperature measurement:

a) At least two different ferro- or paramagnetic temperature sensors may be fitted or incorporated in cyclic alternation with rotational symmetry at the periphery of the support, with temperature ranges that complement one another appropriately.

b) Each temperature sensor has a design consisting of a plurality of these materials, or c) Suitable ferro- or paramagnetic materials with extended range of temperature measurement are mixed by technical means using alloying or sintering techniques.

In a preferred embodiment, one option is that the measurement configuration has a device, arranged directly next to the detector device and likewise electrically coupled to the evaluation circuit, for recording spurious signals, in particular an auxiliary coil, which picks up spurious electromagnetic signals that are not produced by the at least one temperature sensor. In this case, the detector device and the device for recording spurious signals may advantageously be connected in series, in order to suppress the spurious signals before the received-signal amplifier. Extensive suppression of spurious signals may also advantageously be ensured if the electronic evaluation circuit has a bridge circuit network and a received-signal amplifier, assigned to the bridge circuit network, for balancing the spurious signal received by the device for detecting spurious signals, and the useful signal received by the detector device.

One option in a further preferred embodiment is that the at least one temperature sensor and the measurement configuration assigned thereto are formed by a resonant circuit whose resonant frequency and/or damping are strongly temperature-dependent at least in the vicinity of the temperature range of interest. The resonant circuit may in this case consist of an inductor and a capacitor, or a cavity resonator with an input/output coupling antenna, the resonant frequency of which is strongly temperature-dependent because of the combination of a ferromagnetic and/or ferroelectric material with Curie temperatures in the vicinity of the temperature range of interest. In this case, a further option is to provide a circuit for finding the resonant frequency, which automatically determines the resonant frequency of the at least one temperature sensor from a phase comparison between an injected radiofrequency signal and the useful signal received by means of the detection device.

In accordance with another feature of the invention, the measurement configuration may have a phase comparison circuit or lock-in circuit which sets the useful signal delivered by the detector device into an in-phase or balanceable relationship with the rotational frequency of the support. Spurious signals can likewise be blocked out substantially in this way.

In accordance with again another feature of the invention, there is provided a correction circuit which automatically corrects the measured temperature as a function of a recorded change in the magnetization behavior of the temperature sensor, is assigned to the electronic evaluation circuit provided in the measurement configuration.

It will be appreciated that the invention permits easy retrofitting of already existing systems using a kit whose essential components, further to the temperature sensors, are the magnetizing device and detector device and associated electronics for signal amplification and conversion into an analog or digital temperature signal. It is particularly advantageous in this case if the temperature sensor is formed by inserts releasably fitted to the perimeter of the support, for example in the form of headless threaded bolts or the like. Where the temperature sensors as easily interchangeable inserts provides for the additional advantage that the temperature sensors can be removed after a specific number of passages of the rotating table, or after a specified period of use and, if appropriate, examined for changes in the magnetization/temperature dependence.

Other features which are considered as characteristic for the invention are set forth in the appended claims.

Although the invention is illustrated and described herein as embodied in a method and device for measuring a temperature of a rotating support, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
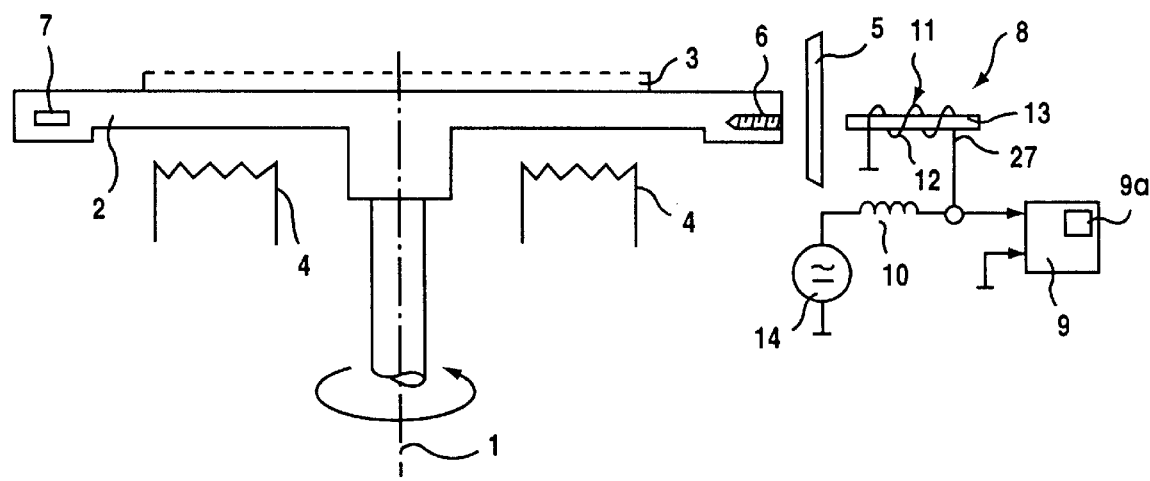
FIG. 1 is a schematic view of a device for measuring a temperature of a rotating epitaxy wafer support plate.

In all the figures of the drawing, sub-features and integral parts that correspond to one another bear the same reference symbol in each case. Referring now to the figures of the drawing in detail and first, particularly, to FIG. 1 thereof, there is seen a support 2 which rotates with predetermined angular velocity about an axis of rotation 1. The top surface of the support 2 carries a semiconductor wafer 3 represented by a dashed line. Heat sources for heating the support 2 are represented, which are schematically denoted by the reference number 4. The configuration as shown is disposed in an evacuable reaction vessel, the reactor walls 5 of which are represented only in part. The configuration is used, for example, in the epitaxial deposition of semiconductor layers on the wafer 3 in coating technology. To control the epitaxial growth process, it is necessary to know the temperature of the rotating support 2 on which the semiconductor wafer 3 lies. For this purpose, temperature sensors 6 and 7 are provided which are thermally coupled to the support 2 and are in contactless communication with a measurement configuration 8 outside the reactor. The measurement configuration 8 includes an electronic evaluation circuit 9. The temperature sensor 6 preferably represents an insert releasably fitted to the perimeter of the support 2, for example in the form of a threaded bolt. As an alternative, the temperature sensor may also be built into the support 2 as represented, for example, by the temperature sensor 7.

The temperature sensor 6, 7 thermally coupled to the support 2 is made of a ferromagnetic or paramagnetic material whose magnetic susceptibility depends on the temperature according to well-known principles. The measurement configuration 8 has a magnetizing device 10 assigned to the temperature sensors 6, 7, and a detector device 11 which is fixed relative to the rotating support 2 and which, when the temperature sensor 6, 7 passes by, delivers a measurement signal 12 that corresponds to the temperature of the support. The detector device 11 can include a Hall probe. The signal 12 is evaluated in the electronic evaluation circuit 9. The electronic evaluation circuit 9 may also include a correction circuit 9a for automatically correcting a measured temperature as a function of a detected change in a magnetization behavior of the temperature sensor(s).

In the exemplary embodiment of FIG. 1, the detector device 11 has a coil 12 with a core 13. The magnetizing device 10 comprises a current source 14 which delivers an electric direct or alternating current that flows through the coil 12. In this embodiment, the coil 12 which picks up the useful signal is at the same time the coil which excites the magnetic field. Instead of the current source 14, the magnetizing device 10 may also be a fixed permanent magnet or electromagnet in the perimeter of the support 2 and in the vicinity of the coil 12. Further, the magnetizing device 10 may also be embodied in the form of permanent magnets which have a high Curie temperature and are fastened directly to the support plate in the vicinity of the temperature sensors 6, 7 or are incorporated into it. In that case, they can be arranged inside the reactor. The latter two variations are not explicitly represented in the figures for reasons of brevity and clarity.

When the magnetizable temperature sensors 6, 7 arranged in the support 2 (the support itself should be substantially non-magnetic) rotate past the coil 12 with the magnet/permanent magnet core combination 12, 13, the magnetization changes according to the magnetizability of the rod-shaped temperature sensors 6, 7, and a brief alternating voltage pulse 27 is produced. This signal is also amplified, in phase with the rotation of the support 2, in a phase-sensitive amplifier present in the evaluation circuit 9 in order to block out spurious signals, and, with constant rotation and exact axial journalling of the support 2, gives a measurement signal whose amplitude is sensitive and, as a rule, monotonically dependent on the temperature of the temperature sensors 6, 7 and therefore of the support 2. It is in this way possible to measure the temperature of the support 2 without substantial structural changes to the support 2 and without switch contacts, which are susceptible to interference, and substantially independent of the layers growing on the support 2.

Figure 2:
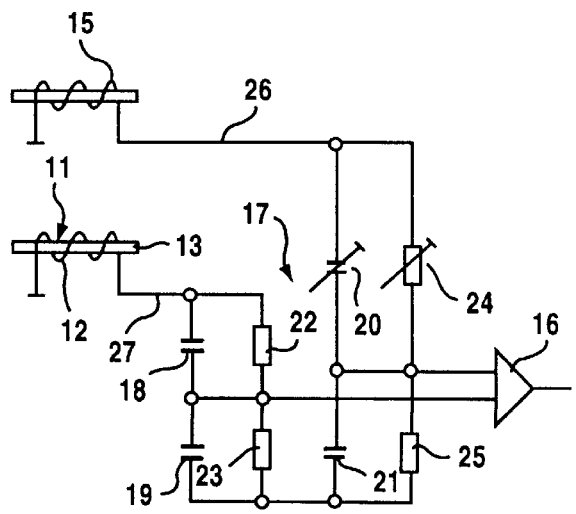
FIG. 2 is a schematic circuit diagram of an electronic evaluation circuit with a bridge circuit network and a received-signal amplifier, of a device for measuring the temperature of a rotating epitaxy wafer support plate.

Referring now to FIG. 2, the measurement configuration 8 has a device, arranged directly next to the detector device 11 and likewise electrically coupled to the evaluation circuit 9, for recording spurious signals. An auxiliary coil 15 picks up spurious electromagnetic signals not produced by the temperature sensors 6, 7. In this embodiment, the electronic evaluation circuit 9 comprises a bridge circuit network 17 with capacitances 18, 19, 20, 21 and electrical resistors 22, 23, 24, 25 which are connected to one another in the manner represented, and a received-signal amplifier 16 which is assigned to the bridge circuit network 17. The amplifier 16 balances the spurious signal 26 received by the device 15 for recording spurious signals and the useful signal 27 received by the detector device 11. This circuit allows extensive suppression of spurious signals.

In another embodiment, which is not illustrated in further detail for purposes of brevity, the detector device 11 and the device 15 for recording spurious signals may be connected directly in series. The spurious signals are thereby suppressed before they reach the received-signal amplifier 16.

Figure 3:
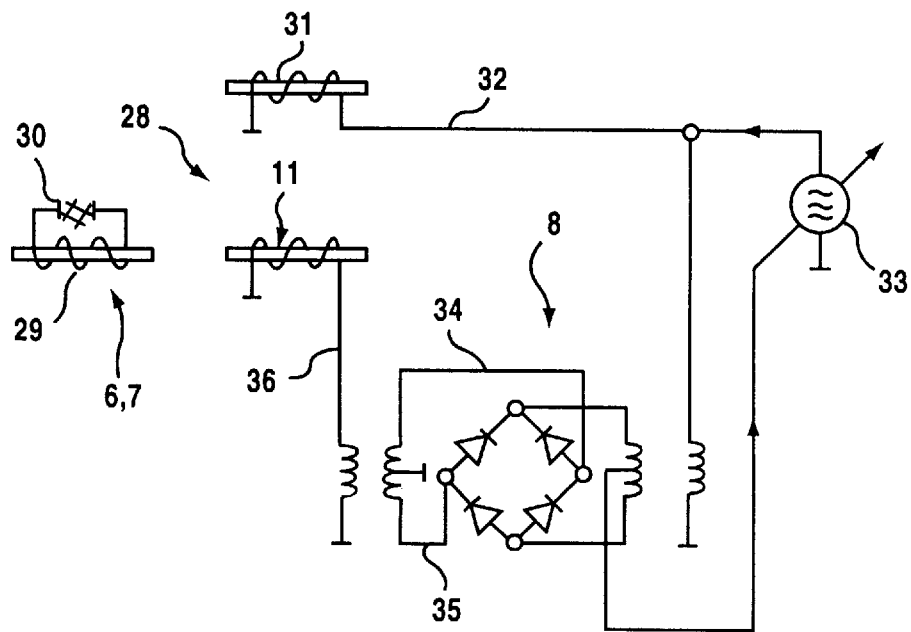
FIG. 3 is a similar diagram of a temperature sensor embodied as a component of a resonant circuit.

FIG. 3 relates to a further exemplary embodiment of the invention. The temperature sensor 6 and 7, respectively, is formed a part of a resonant circuit 28 and includes an inductor 29 and a capacitor 30, which has a ferroelectric as its temperature-dependent material. The resonant circuit 28, besides a cavity resonator with input/output coupling antenna, further has, as components, in particular the detector device 11 and a further coil 31 which receives a radiofrequency signal 32 from a radiofrequency generator 33. The resonant frequency and/or damping of the resonant circuit 28 are strongly temperature-dependent because of a suitably chosen combination of a ferromagnetic and/or ferroelectric material with Curie temperatures within the temperature range of interest. In this illustrative embodiment, the measurement configuration 8 further has a resonant frequency determination circuit 34 with a phase mixer 35 that automatically determines the resonant frequency of the temperature sensor 6, 7 by comparing the phases of the radiofrequency signal 32 injected by the coil 31 and the useful signal 36 received by means of the detector coil 12. From this it is possible to derive the actual temperature of the support.

Figure 4:
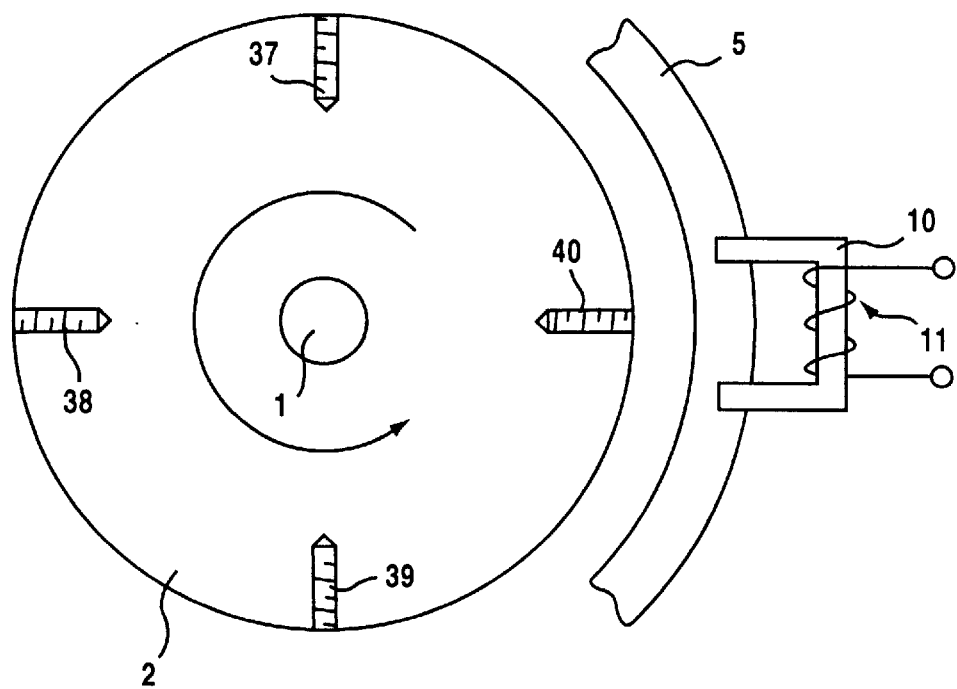
FIG. 4 is a schematic plan view of a further embodiment of the invention, in which the temperature sensor is coupled by way of a magnetic circuit which is closed as far as possible.

In the embodiment of the invention represented in the schematic plan view of FIG. 4, four temperature sensors 37, 38, 39, 40 are provided which are positively (form-lockingly) fitted into bores at the external periphery of the rotating support plate 2. The sensors are disposed exactly symmetrical with regard to the axis so as to assure proper rotational balancing. The temperature sensors 37, 38, 39, 40 are formed, for instance, as threaded bolts having a diameter of about 5 mm and a length of 10 mm. The detector coil 11, with a ferromagnetic U-core 10 of constant magnetizability $\mu$, connected with a permanent magnet of constant magnetization and high coercive force, for example made of the material CoSm, is located at the perimeter of the reactor wall 5, as close as possible to the edge of the support 2. The wall 5 of the reactor housing should itself be non-magnetic, or at least only weakly magnetic, and may, for example, be made of an austenitic steel or the like. As noted, the figures show the configuration according to the invention only schematically. Naturally, the details of the system may expediently be such that, when the U-coil 10 comes closest to the temperature sensors 37 to 40, this results in a maximum magnetic flux B so that the alternating voltage signal of the coil 12 is as large as possible.

Figure 5:
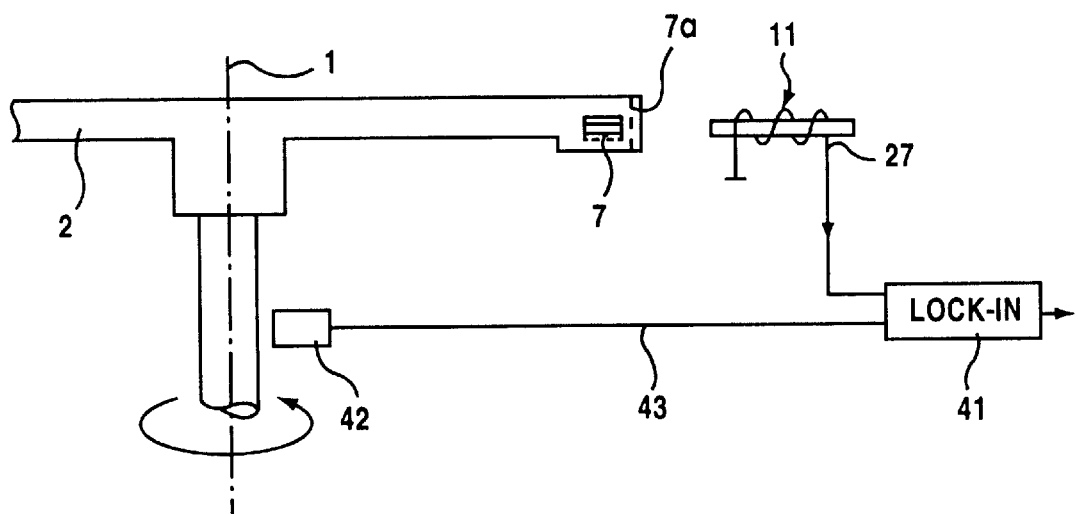
FIG. 5 is a schematic view of a further exemplary embodiment of the invention, in which the electronic evaluation circuit has a phase comparison circuit (lock-in circuit).

Referring now to FIG. 5, the measurement configuration 8 thereof has a phase comparison circuit or so-called lock-in circuit 41, which sets the useful signal 27 delivered by the detector device 11 into an in-phase or balanceable relationship with the rotational frequency of the support 2. For this purpose, a tachometer 42 coupled to the drive shaft of the support 2 is provided, which delivers a signal 43 proportional to the angular velocity of the support 2 for evaluation in the lock-in circuit 41. The sensor 7 in FIG. 5 is illustrated as a plurality of mutually adjacent rods or several pipes or pipe-shaped rods disposed one inside the other. Also indicated, at reference numberal 7a, are grooves or other discontinuities and non-uniformities at the outer perimeter of the support 2.

We claim:

1. A device for measuring a temperature of a rotating support, comprising:

at least one temperature sensor thermally coupled to and rotating with a rotating support, said at least one temperature sensor being formed of a material selected from the group consisting of ferro-magnetic, paramagnetic, and ferroelectric materials and having a temperature-dependent magnetic or electric susceptibility;

a measurement configuration assigned to said at least one sensor, said measurement configuration including a polarizing device for polarizing said at least one temperature sensor, and a stationary detector device disposed such that said at least one sensor passes by said detector device upon a rotation of the rotating support and said detector device outputs a measurement signal corresponding to a temperature of the support.

2. The device according to claim 1, wherein said polarizing device includes one of a permanent magnet and an electromagnet which is fixed relative to the rotating support, and said detector device is an inductor.

3. The device according to claim 2, wherein said detector device is a coil.

4. The device according to claim 1, wherein said polarizing device and said detector device are each a coil which, upon being subjected to an electric current, produces a polarizing field.

5. The device according to claim 1, wherein said at least one temperature sensor is one of a plurality of temperature sensors disposed on or in the support.

6. The device according to claim 5, wherein the support has a rotational axis and said plurality of temperature sensors are symmetrically disposed about the rotational axis of the support.

7. The device according to claim 1, wherein said temperature sensor comprises a number of pieces formed of a plurality of materials selected from the group consisting of ferromagnetic material, paramagnetic material, and ferroelectric material, having different Curie temperatures.

8. The device according to claim 7, wherein said plurality of materials are a plurality of mutually adjacent rods.

9. The device according to claim 7, wherein said plurality of materials are a plurality of pipe-shaped rods disposed one inside another.

10. The device according to claim 1, wherein said temperature sensor is defined by magnetic non-uniformities formed in an edge region of the support.

11. The device according to claim 10, wherein said magnetic non-uniformities are defined in that the edge region of the support has one of discontinuities and grooves formed at a perimeter edge thereof.

12. The device according to claim 1, wherein said material of said at least one temperature sensor is a material selected from the group consisting of iron with a Curie temperature of approximately 780° C., cobalt with a Curie temperature of approximately 1130° C., nickel with a Curie temperature of approximately 375° C., a nickel alloy, and 78 Permalloy with 78.5% nickel and a Curie temperature of approximately 600° C.

13. The device according to claim 1, wherein said measurement configuration includes an auxiliary device for recording spurious signals disposed directly adjacent said detector device, said auxiliary device picking up spurious electromagnetic signals not produced by said at least one temperature sensor.

14. The device according to claim 13, wherein said auxiliary device is an auxiliary coil.

15. The device according to claim 13, wherein said detector device and said auxiliary device are connected in series.

16. The device according to claim 13, which further comprises an electronic evaluation circuit electrically connected to said detector device and said auxiliary device, said electronic evaluation circuit having a bridge circuit network and a received-signal amplifier connected to said bridge circuit network, for balancing a spurious signal received by said auxiliary device and a useful signal received by said detector device.

17. The device according to claim 1, wherein said at least one temperature sensor and said measurement configuration are a resonant circuit having a resonant frequency which is strongly temperature-dependent in a temperature range of interest.

18. The device according to claim 17, which further comprises a circuit for automatically determining the resonant frequency of said at least one temperature sensor from a phase comparison between an injected radiofrequency signal and the useful signal received with said detector device.

19. The device according to claim 1, wherein said at least one temperature sensor and said measurement configuration are a resonant circuit having a damping characteristic which is strongly temperature-dependent in a temperature range of interest.

20. The device according to claim 1, which further comprises a phase comparison or lock-in circuit for relating a useful signal of said detector device to a rotational frequency of the support.

21. The device according to claim 1, wherein said at least one temperature sensor is an insert releasably fitted to a perimeter of the support.

22. The device according to claim 1, wherein said detector device includes a Hall probe.

23. The device according to claim 1, wherein the support is a rotating plate carrying a semiconductor in a coating process.

24. The device according to claim 1, which further comprises an electronic evaluation circuit connected to said measurement configuration, said evaluation circuit having a correction circuit for automatically correcting a measured temperature as a function of a detected change in a magnetization behavior of said at least one temperature sensor.

25. A method for measuring a temperature of a support rotating with predetermined angular velocity about an axis of rotation, which comprises:
  providing a temperature sensor thermally coupled to a rotating support, the temperature sensor having a material selected from a group of materials consisting of ferromagnetic, paramagnetic, and ferroelectric materials, and having a temperature-dependent susceptibility according to the Curie law and Curie-Weiss law;
  providing a measurement configuration with a magnetizing device and a detector device which is fixed relative to the rotating support; and
  detecting a measurement signal with the measurement configuration when the temperature sensor passes by the detector device as the support rotates together with the temperature sensor.

26. The method according to claim 25, which comprises magnetizing the temperature sensor with a magnet which is stationary relative to the rotating support.

27. The method according to claim 25, wherein both the magnetizing device and the detector device are formed by a coil, and the method further comprises applying an electric current to the coil to produce a magnetizing field.

* * * * *